(12) United States Patent
Wu et al.

(10) Patent No.: US 11,838,507 B2
(45) Date of Patent: Dec. 5, 2023

(54) VIDEO ENCODING METHOD AND APPARATUS, ELECTRONIC DEVICE, AND COMPUTER-READABLE STORAGE MEDIUM

(71) Applicant: ZHEJIANG UNIVIEW TECHNOLOGIES CO., LTD., Binjiang District Hangzhou (CN)

(72) Inventors: Hui Wu, Binjiang District Hangzhou (CN); Guosong Zhan, Binjiang District Hangzhou (CN)

(73) Assignee: Zhejiang Uniview Technologies Co., Ltd., Zhejiang (CN)

( * ) Notice: Subject to any disclaimer, the term of this patent is extended or adjusted under 35 U.S.C. 154(b) by 138 days.

(21) Appl. No.: 17/294,461

(22) PCT Filed: Apr. 12, 2019

(86) PCT No.: PCT/CN2019/082431
§ 371 (c)(1),
(2) Date: May 17, 2021

(87) PCT Pub. No.: WO2020/103384
PCT Pub. Date: May 28, 2020

(65) Prior Publication Data
US 2021/0409713 A1 Dec. 30, 2021

(30) Foreign Application Priority Data
Nov. 19, 2018 (CN) .......................... 201811376866.7

(51) Int. Cl.
H04N 19/52 (2014.01)
H04N 19/70 (2014.01)
(Continued)

(52) U.S. Cl.
CPC ......... *H04N 19/124* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

| 5,214,507 A | 5/1993 | Aravind et al. |
| 10,003,801 B2 | 6/2018 | Oishi |

(Continued)

FOREIGN PATENT DOCUMENTS

| CN | 101325711 | 12/2008 |
| CN | 102932641 | 2/2013 |

(Continued)

OTHER PUBLICATIONS

Office Action dated Sep. 14, 2021 in CN Patent Application No. 201811376866.7, pp. 1-10.

(Continued)

*Primary Examiner* — Mohammad J Rahman
(74) *Attorney, Agent, or Firm* — Byrne Poh LLP

(57) ABSTRACT

Provided are a video encoding method and apparatus, an electronic device, and a computer-readable storage medium. The method includes: acquiring status information of each macroblock in an image to be encoded; dividing the image to be encoded into a plurality of status regions according to the status information of each macroblock; determining a quantizer parameter adjustment value of each of the plurality of status regions in the image to be encoded according to a preset quantizer parameter value table; acquiring a quantizer parameter encoding value of each macroblock in a reference frame image of the image to be encoded; determining a quantizer parameter encoding value of each macroblock in (Continued)

the image to be encoded; and compressing and encoding the image to be encoded.

20 Claims, 4 Drawing Sheets

(51) Int. Cl.
  *H04N 19/105* (2014.01)
  *H04N 19/119* (2014.01)
  *H04N 19/124* (2014.01)
  *H04N 19/139* (2014.01)
  *H04N 19/176* (2014.01)
  *H04N 19/177* (2014.01)

(52) U.S. Cl.
  CPC ......... *H04N 19/139* (2014.11); *H04N 19/176* (2014.11); *H04N 19/177* (2014.11); *H04N 19/52* (2014.11); *H04N 19/70* (2014.11)

(56) References Cited

U.S. PATENT DOCUMENTS

| | | | |
|---|---|---|---|
| 2005/0281479 A1 | 12/2005 | Song | |
| 2008/0063052 A1* | 3/2008 | Lin | H04N 19/179 375/E7.176 |
| 2008/0304562 A1 | 12/2008 | Chang et al. | |
| 2009/0080518 A1 | 3/2009 | Au | |
| 2009/0096883 A1 | 4/2009 | Ishii | |
| 2011/0060792 A1* | 3/2011 | Ebersviller | H04N 19/46 709/231 |
| 2012/0069897 A1* | 3/2012 | Anselmo | H04N 19/80 348/700 |
| 2012/0328004 A1 | 12/2012 | Coban et al. | |
| 2013/0142250 A1 | 6/2013 | Berbecel | |
| 2014/0161184 A1* | 6/2014 | Hiraoka | H04N 19/15 375/240.18 |
| 2014/0254660 A1* | 9/2014 | La | H04N 19/107 375/240.02 |
| 2014/0269901 A1* | 9/2014 | Shi | H04N 19/124 375/240.03 |
| 2014/0269903 A1* | 9/2014 | McCarthy | H04N 19/176 375/240.03 |
| 2014/0355668 A1* | 12/2014 | Carmel | H04N 19/192 375/240.02 |
| 2015/0016510 A1 | 1/2015 | Carlsson et al. | |
| 2015/0288964 A1* | 10/2015 | Puri | H04N 19/46 375/240.03 |
| 2015/0350686 A1* | 12/2015 | Zhou | H04N 19/42 375/240.26 |
| 2016/0295250 A1* | 10/2016 | Yang | H04N 21/234363 |
| 2017/0085892 A1* | 3/2017 | Liu | H04N 19/53 |
| 2018/0109794 A1 | 4/2018 | Wang et al. | |
| 2019/0104314 A1* | 4/2019 | Yonezawa | H04N 19/51 |

FOREIGN PATENT DOCUMENTS

| | | |
|---|---|---|
| CN | 105516720 | 4/2016 |
| CN | 106170979 | 11/2016 |
| CN | 106878727 | 6/2017 |
| CN | 108012149 | 5/2018 |
| JP | 2006032999 | 2/2006 |
| KR | 20150102874 | 9/2015 |
| WO | WO2009149564 | 12/2009 |

OTHER PUBLICATIONS

European Search Report dated Aug. 23, 2022 in EP Patent Application No. 19887129.5, pp. 1-16.
International Search Report dated Jun. 27, 2019 in International Patent Application No. PCT/CN2019/082431, pp. 1-4.

* cited by examiner

VIDEO ENCODING METHOD AND APPARATUS, ELECTRONIC DEVICE, AND COMPUTER-READABLE STORAGE MEDIUM

CROSS-REFERENCE TO RELATED APPLICATIONS

The present disclosure is a U.S. National Stage Application of PCT Application Serial No. PCT/CN2019/082431, filed Apr. 12, 2019, which claims priority to Chinese Patent Application No. 201811376866.7 filed with the CNIPA on Nov. 19, 2018, the disclosures of which are incorporated herein by reference in their entireties.

TECHNICAL FIELD

The present disclosure relates to the technical field of video processing, for example, a video encoding method and apparatus, an electronic device, and a computer-readable storage medium.

BACKGROUND

With the development of video processing technologies, video applications based on network communication technologies such as video surveillance, video conferencing, video education and training, and video live broadcast, have become part of people's study, work, and life.

The digitization and high-definition of video image formats have improved the clarity of images in an all-round way. Video image formats have developed from the mainstream 1080P resolution to ultra-high-definition resolutions of 5M, 8M, and even 12M, which sets higher requirements for the network transmission bandwidth. However, the bandwidth upgrade speed of the current network infrastructure is much lower than the development speed of video image formats. How to achieve video streaming transmission with a higher resolution under the condition of the limited network transmission bandwidth is a technical problem that researchers urgently need to solve.

SUMMARY

The present disclosure provides a video encoding method and apparatus, an electronic device, and a computer-readable storage medium so that the image quality can be ensured while the video streaming encoding rate can be reduced.

The present disclosure provides a video encoding method. The method includes: acquiring an image to be encoded and acquiring status information of each macroblock in the image to be encoded; dividing the image to be encoded into multiple status regions according to the status information of each macroblock; determining a quantizer parameter adjustment value of each of the multiple status regions in the image to be encoded according to a preset quantizer parameter value table; acquiring a quantizer parameter encoding value of each macroblock in a reference frame image of the image to be encoded; determining a quantizer parameter encoding value of each marcoblock in the image to be encoded according to the quantizer parameter encoding value of each macroblock in the reference frame image and the quantizer parameter adjustment value of each of the multiple status regions in the image to be encoded; and compressing and encoding the image to be encoded by using the quantizer parameter encoding value of each macroblock in the image to be encoded.

The present disclosure further provides a video encoding apparatus. The apparatus includes a status information statistics module, a status region division module, a quantizer parameter adjustment value determination module, a quantizer parameter encoding value acquisition module, a quantizer parameter encoding value determination module, and a compression encoding module. The status information statistics module is configured to acquire an image to be encoded and acquire status information of each macroblock in the image to be encoded. The status region division module is configured to divide the image to be encoded into multiple status regions according to the status information of each macroblock. The quantizer parameter adjustment value determination module is configured to determine a quantizer parameter adjustment value of each of the multiple status regions in the image to be encoded according to a preset quantizer parameter value table. The quantizer parameter encoding value acquisition module is configured to acquire a quantizer parameter encoding value of each macroblock in a reference frame image of the image to be encoded. The quantizer parameter encoding value determination module is configured to determine a quantizer parameter encoding value of each macroblock in the image to be encoded according to the quantizer parameter encoding value of each macroblock in the reference frame image and the quantizer parameter adjustment value of each of the multiple status regions in the image to be encoded. The compression encoding module is configured to compress and encode the image to be encoded by using the quantizer parameter encoding value of each macroblock in the image to be encoded.

The present disclosure further provides an electronic device. The electronic device includes: at least one processor; and a memory, which is configured to store at least one program, when executed by the at least one processor, the at least one program enables the at least one processor to perform the preceding method.

Embodiments of the present disclosure provide a computer-readable storage medium, which is configured to store a computer program which, when executed by a processor, performs the preceding method.

REFERENCE LIST

Figure 1:
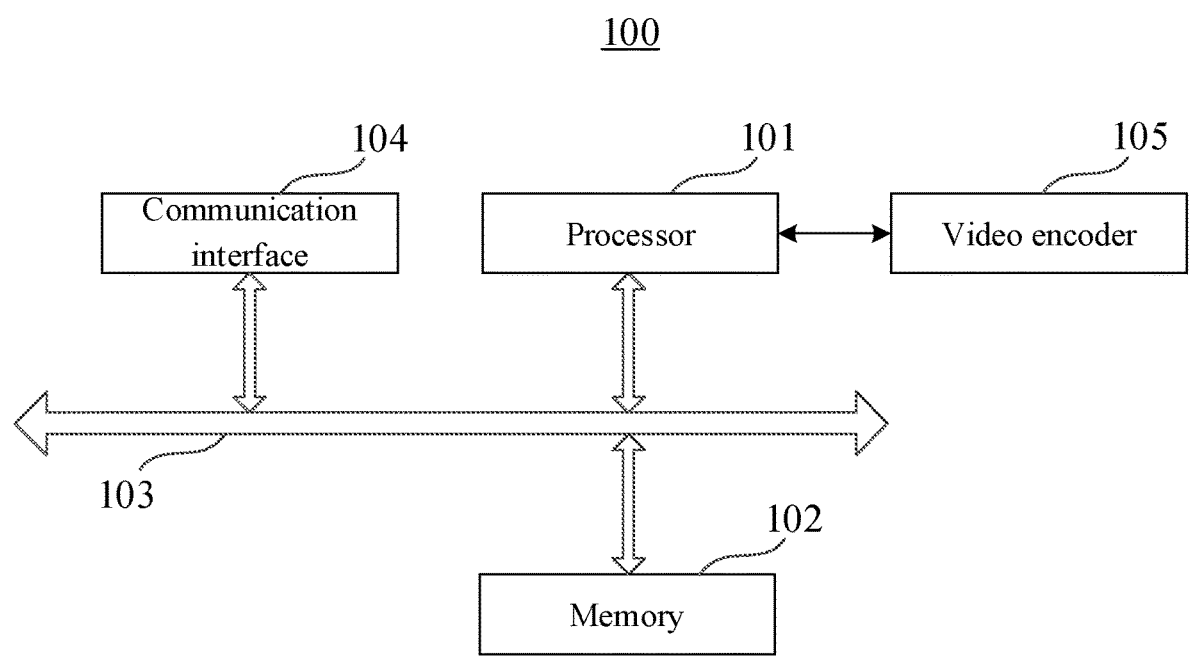
FIG. 1 is a block diagram of a video encoding device according to an embodiment of the present disclosure.

100 video encoding device
101 processor
102 memory
103 bus
104 communication interface 105 video encoder
200 video encoding apparatus
201 status information statistics module
202 status region division module
203 QP adjustment value determination module
204 QP encoding value acquisition module
205 QP encoding value determination module
206 compression encoding module
207 GOP length calculation module
208 GOP adjustment module
209 first execution module
210 second execution module
211 third execution module

DETAILED DESCRIPTION

Compared with the related art, embodiments of the present disclosure provide a video encoding method and apparatus. An image to be encoded is divided into multiple status regions according to status information of each macroblock in the image to be encoded, and a quantizer parameter adjustment value of each status region in the image to be encoded is determined according to a preset quantizer parameter value table; a quantizer parameter encoding value of each macroblock in the image to be encoded is determined according to the quantizer parameter adjustment value of each status region in the image to be encoded and a quantizer parameter encoding value of each macroblock in a reference frame image; the image to be encode is compressed and encoded by using the quantizer parameter encoding value of each macroblock in the image to be encoded. In embodiments of the present disclosure, before compression and encoding are performed, the quantizer parameter encoding value of each macroblock is set according to the status of each macroblock. In this manner, during the subsequent compression and encoding, each macroblock may be compressed and encoded according to the status of each macroblock. For example, the quality of the macroblock with little change may be reduced so that the amount of data can be reduced to the greatest extent, and the video streaming encoding rate is effectively reduced while the image quality is ensured.

When video encoding is performed, in view of the reconstruction of key video information and the limitation of transmission bandwidth, a compromise between data compression and high-quality preservation of key information may be achieved by using region of interest (ROI) video encoding. Specifically, by using the ROI video encoding, a region of interest in the image is selected, high-quality and lossless encoding is performed on the selected region of interest, and standard-definition video compression is performed on the other regions that are not selected by reducing the encoding rate and image quality, which is conducive to saving the network bandwidth occupation and video storage space. Compared with the related fixed encoding rate encoding method, ROI video encoding can improve the image quality at the same encoding rate while the video encoding streaming is reduced.

However, since the ROI is one rectangular region, too strong control cannot be performed; otherwise a serious sense of hierarchy exists between the region of interest and other regions in the decoded video image. Specifically, by using the ROI video encoding, based on rectangular boundaries, the region of interest in the image to be encoded is subdivided and subject to quantizer parameter control, which usually results in block distribution of residual coefficients in the encoding streaming and a serious sense of hierarchy between the region of interest and other regions in the decoded video image. Moreover, simple ROI control cannot ensure high-quality overall effect while the encoding rate is greatly reduced. Especially in the case where many moving objects exist, the ROI video encoding cannot reduce the encoding rate well while the quality is ensured.

The present disclosure provides a video encoding method and apparatus. Before compression and encoding are performed, a quantizer parameter (QP) encoding value (that is, the QP encoding value; similarly, hereinafter, a QP value is a quantizer parameter value, a QP value table is a quantizer parameter value table, and a QP adjustment value is a quantizer parameter adjustment value, which will not be described in detail) of each macroblock is set according to the status of each macroblock. In this manner, during the subsequent compression and encoding, each macroblock may be compressed and encoded according to the status of each macroblock. For example, the quality of the macroblock with little change may be reduced so that the amount of data can be reduced to the greatest extent, and the video streaming encoding rate is effectively reduced while the image quality is ensured. The detailed description will be performed below.

Referring to FIG. 1, FIG. 1 is a block diagram of a video encoding device 100 according to an embodiment of the present disclosure. The video encoding device 100 includes a processor 101, a memory 102, a bus 103, a communication interface 104, and a video encoder 105. The processor 101, the memory 102, and the communication interface 104 are connected through the bus 103, and the video encoder 105 cooperates with the processor 101.

As an embodiment, the video encoding device 100 may be configured to perform compression encoding processing on a sequence of video frames acquired through live video recording. The video encoding device 100 may be a front-end photographic device such as a surveillance camera, a webcam, a civilian-grade camera, and a professional-grade camera, may be an embedded hard disk digital video recorder (DVR), and may also be a hardware circuit structure related to video encoding in the front-end photographic device or the embedded hard disk digital video recorder.

As another embodiment, the video encoding device 100 may also be configured to perform sampling, compression and encoding processing on video analog signals. The video encoding device 100 may be a PC-type hard disk digital video recorder, a computer device with a video capture card, or a combination of the hardware part and software module related to video encoding in the PC-type hard disk digital video recorder and the computer device with a video capture card.

As yet another embodiment, the video encoding device 100 may also be configured to decode the encoded video data file and then encode the video data file to obtain video streaming data or video data file with the new encoding streaming. The video encoding device 100 may be a video server, a network video record (NVR), a graphics workstation, a PC, and a laptop.

The memory 102 may include a high-speed random-access memory (RAM) and may also include a non-volatile memory, for example, at least one disk memory. The communication connection between the video encoding device 100 and at least one other network element is achieved through at least one communication interface 104 (which may be wired or wireless).

The bus 103 may be an ISA bus, a PCI bus, an EISA bus, or the like, which is shown in FIG. 1 only by one directional arrow, but it does not mean that there is only one bus or one type of bus.

Figure 5:
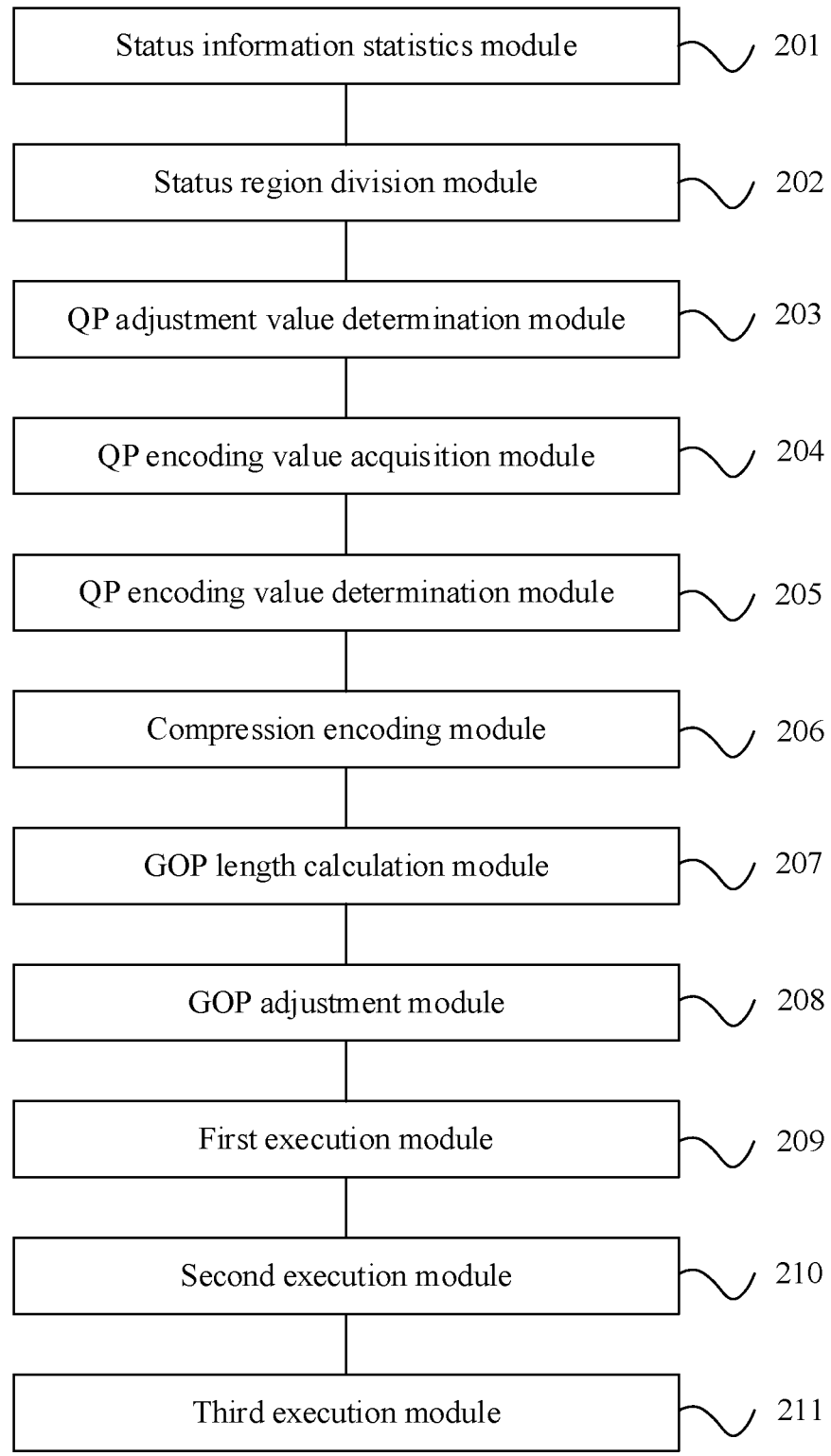
FIG. 5 is a block diagram of a video encoding apparatus according to an embodiment of the present disclosure.

The memory 102 is configured to store a program. For example, a video encoding apparatus 200 is shown in FIG. 5. The video encoding apparatus 200 includes at least one software functional module that can be stored in the memory 102 in the form of software or firmware or fixed in an operating system (OS) of the video encoding device 100. After receiving an execution instruction, the processor 101 executes the program to perform the video encoding method disclosed in the following embodiments.

The processor 101 may be an integrated circuit chip with a signal processing capability. In the implementation process, each step of the methods described above may be performed by an integrated logic circuit of hardware or a software instruction in the processor 101. The processor 101 may be a general-purpose processor such as a central processing unit (CPU), a network processor (NP), a digital signal processor (DSP), an application specific integrated circuit (ASIC), a field-programmable gate array (FPGA) or other programmable logic devices, discrete gates or transistor logic devices or discrete hardware components.

The video encoder 105 is configured to compress and encode a sequence of video frames to form video streaming data. The video encoder 105 may be, and is not limited to, a video encoding chip, a video encoding hardware device, a video encoding software module, and the like. In terms of the implementation form, the video encoder 105 may be a separate chip, device, or software module, or a chip, device, or software module integrated with a video decoder.

Embodiments of the present disclosure further provide an electronic device and the electronic device is the video encoding device 100 described above.

Embodiments of the present disclosure provide a computer-readable storage medium, the computer-readable storage medium is configured to store a computer program which, when executed by a processor 101, performs the video encoding method disclosed in the following embodiments.

Embodiment One

In this embodiment, the case where the video encoding device 100 is aimed at a sequence of video frames captured in a typical surveillance scene is used as an example, and the video encoding method provided in embodiments of the present disclosure is described.

The typical surveillance scene is a relatively fixed scene of a target scene during the video shooting. In a video frame image obtained in the typical surveillance scene, the background region that remains stationary occupies a relative large image region, and the motion region may be separated from the background region through motion detection. Moreover, within one period of time, the types of moving objects in the typical surveillance scene remain relatively stable. For example, in the case where the typical surveillance scene is building surveillance, the moving objects in the typical surveillance scene are mainly pedestrians and vehicles entering and leaving; in the case where the typical surveillance scene is traffic roads, the moving objects in the typical surveillance scene are mainly vehicles. In daily work and life, video surveillance, video conferencing, video live broadcast, video education and training, and video interactive communication are all typical surveillance scenes.

Before the video encoding method provided in this embodiment is performed, different exposure gain tests need to be performed on the video encoding device 100 in a laboratory environment so that QP value tables of the video encoding device 100 under different exposure gains are obtained. The specific test method is described below.

The video encoding device 100 is caused to be aimed at the typical surveillance scene, and different degrees of illumination are given. In the case where the illumination is sufficient, a QP value of each macroblock in the image is adjusted, and a subjective evaluation of the scene in the image is performed. Good, normal, and poor regions are selected from a motion low-frequency region, a motion high-frequency region, a static low-frequency region, and a static high-frequency region, and the QP value corresponding to each region, an exposure value the video encoding device 100 and a gain value of the video encoding device 100 are recorded. It is assumed that $QP_{good}$=25-51, $QP_{normal}$=30-51, $QP_{poor}$=35-51 and the subjective evaluation indicates that in the image, the motion low-frequency region is good, the motion high-frequency region and the static low-frequency region are normal, and the static high-frequency region is poor, $QP_{good}$ in the motion low-frequency region=25, $QP_{normal}$ in the motion high-frequency region and the static low-frequency region=35 and the $QP_{poor}$ in the static high-frequency region=45.

Then the preceding process is repeated until the brightness of the image is reduced to the minimum, and the QP value table of the video encoding device 100 under different test exposure gain values is obtained. Moreover, during the test, gain shutter information and noise variances in a noise-free interval, a low-noise interval, and a high-noise interval are recorded. The QP value table obtained in this manner includes multiple test exposure gain values, and the QP value of the motion high-frequency region, the QP value of the motion low-frequency region, the QP value of the static high-frequency region, and the QP value of the static low-frequency region corresponding to each test exposure gain value. Each test exposure gain value includes an exposure value and a gain value.

Figure 2:
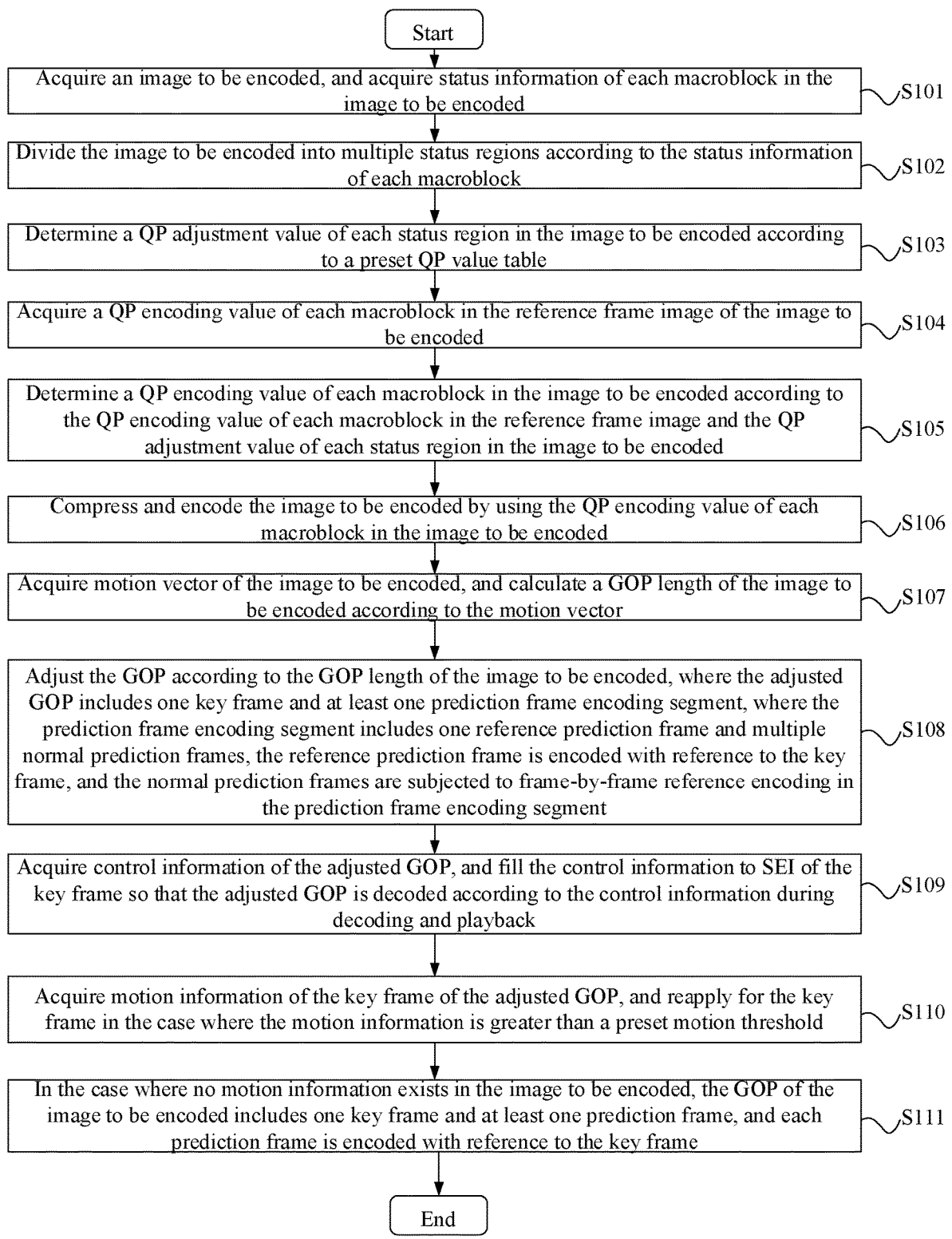
FIG. 2 is a flowchart of a video encoding method according to an embodiment of the present disclosure.

Referring to FIG. 2, FIG. 2 is a flowchart of a video encoding method according to an embodiment of the present disclosure. In the video encoding method, a sequence of video frames are sequentially compressed with a group of pictures (GOP) as an encoding structure unit. The GOP includes a key frame at the start position and a prediction frame following the key frame (similarly, in the following, a GOP encoding structure is an encoding structure of the group of pictures, an GOP length is the length of the group of pictures, and the GOP adjustment module is the group of pictures adjustment module, which will not be repeated). The video encoding method includes the steps described below.

In step S101, an image to be encoded is acquired, and status information of each macroblock in the image to be encoded is acquired.

In this embodiment, the image to be encoded is the data before the compression and encoding, and the image to be encoded may be an I frame, P frame, or B frame. The I frame is a key frame in the GOP encoding structure, and the key frame uses full frame compression encoding. The P frame is a forward prediction encoding frame, the forward prediction encoding frame uses the previous I frame or P frame of the current frame as a reference frame, only difference data between the current frame and the reference frame is recorded during encoding, and a complete P frame video image is obtained through the difference data between the current frame and the reference frame superposed on the reference frame during decoding. The B frame is a two-way prediction encoding frame, the two-way prediction encoding frame uses the previous frame and the next frame of the current frame as a reference frame, only the difference data between the current frame and the reference frame is recorded during encoding, and a complete B frame video image is obtained through the difference data between the current frame and the previous frame and the next frame superposed on the previous frame and the next frame during decoding.

In embodiments of the present disclosure, a macroblock is the basic unit of video encoding. One macroblock is composed of one luminance pixel block and two additional chrominance pixel blocks. The number of macroblocks into which each frame of image is divided in one sequence of video frames is consistent, and the number of pixels included in the row of each macroblock and the number of pixels included in the column of each macroblock are both a multiple of four. For example, the size of the macroblock may be 32×32, 16×16, 4×4, and so on.

In embodiments of the present disclosure, after the image to be encoded is acquired, the status information of each macroblock in the image to be encoded needs to be acquired. The status information includes motion detection information, brightness information, and noise variance information. The size of the macroblock may be 16×16. At the same time, a current exposure gain value of the image to be encoded is recorded. The motion detection information may be determined by comparing the image to be encoded with a reference frame image. If the image to be encoded is an I frame, the reference frame image may be the previous I frame; if the image to be encoded is a P frame, the reference frame image may be the previous I frame or P frame of the current frame; if the image to be encoded is a B frame, the reference frame image may be the previous frame and the next frame of the current frame.

In step S102, the image to be encoded is divided into multiple status regions according to the status information of each macroblock.

In this embodiment, after the status information of each macroblock in the image to be encoded is acquired, the image to be encoded is divided into multiple status regions according to the status information of each macroblock. The multiple status regions include a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region.

The method of dividing the image to be encoded into multiple status regions may include the steps described below.

The image to be encoded is divided into a motion region and a static region according to the motion detection information. Since noise affects the motion detection information, a distinction threshold configured for dividing the motion region from the static region may be adjusted flexibly according to the current exposure gain value of the image to be encoded, that is, in the case where the current exposure gain value of the image to be encoded corresponds to the noise-free interval, the low-noise interval, and the high-noise interval, the distinction thresholds configured for dividing the motion region and the static region are different and need to be adjusted flexibly so that the influence of noise on the motion detection information is offset, and the accuracy of the motion region detection in each surveillance scene is improved.

According to the brightness information, the motion region is divided into a motion bright region, a motion dark region, and a motion excessive dark region, and the static region is divided into a static bright region, a static dark region, and a static excessive dark region. Since the distinction threshold of the image brightness does not depend on the gain shutter, the distinction threshold does not need to be adjusted in the case where the region is divided according to the brightness information.

According to the noise variance information, the motion bright region, the motion dark region, the motion excessive dark region, the static bright region, the static dark region, and the static excessive dark region are divided into a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region. Since noise also affects the noise variance information, in the case where region division is performed according to the noise variance information, the distinction threshold needs to be adjusted flexibly according to the gain shutter so that the influence of noise on the noise variance information is offset, and the accuracy of high-frequency-and-low-frequency region detection of the image in each surveillance scene is improved.

Specifically, according to the noise variance information, the motion bright region may be divided into the motion high-frequency bright region and the motion low-frequency bright region, the motion dark region may be divided into the motion high-frequency dark region and the motion low-frequency dark region, the motion excessive dark region may be divided into the motion high-frequency excessive dark region and the motion low-frequency excessive dark region, the static bright region may be divided into the static high-frequency bright region and the static low-frequency bright region, the static dark region may be divided into the static high-frequency dark region and the static low-frequency dark region, and the static excessive dark region may be divided into the static high-frequency excessive dark region and the static low-frequency excessive dark region.

In step S103, a QP adjustment value of each status region in the image to be encoded is determined according to a preset QP value table.

In this embodiment, after the image to be encoded is divided into multiple status regions, the QP adjustment value of each status region in the image to be encoded is determined according to the preset QP value table obtained by performing different exposure gain tests on the video encoding device 100 in a laboratory environment. The specific determination process may include: acquiring a current exposure gain value of the image to be encoded; comparing the current exposure gain value with multiple test exposure gain values one by one, and determining a target exposure gain value consistent with the current exposure gain value from the multiple test exposure gain values; and determining the QP adjustment value of each status region in the image to be encoded according to a QP value of the motion high-frequency region, a QP value of the motion low-frequency region, a QP value of the static high-frequency region, and a QP value of the static low-frequency region corresponding to the target exposure gain value.

In this embodiment, in the case where the image to be encoded is a key frame, that is, an I frame, a minimum QP encoding value of the I frame needs to be limited, and the minimum QP encoding value is $QP_{good}$ corresponding to the target exposure gain value in the preset QP value table. In this manner, the user needs are satisfied while the encoding rate is reduced.

In the case where the image to be encoded is a prediction frame, that is, a P frame or a B frame, the method of determining the QP adjustment value of each status region according to the QP value of the motion high-frequency region, the QP value of the motion low-frequency region, the QP value of the static high-frequency region, and the QP value of the static low-frequency region corresponding to the target exposure gain value in the preset QP value table may be as follows: since each test exposure gain value in the preset QP value table corresponds to one noise interval, the noise interval may be a low-noise interval, a medium-noise interval, or a high-noise interval, and the medium-noise interval may be a transition interval between the low-noise interval and the high-noise interval; therefore, the noise interval corresponding to the target exposure gain value is firstly determined, and then the QP adjustment value of each status region is determined according to the noise interval, which includes the steps described below.

In the case where the target exposure gain value corresponds to the low-noise interval, the QP adjustment value of each status region in the image to be encoded is determined according to first preset formulas based on the QP value of the motion high-frequency region, the QP value of the motion low-frequency region, the QP value of the static high-frequency region, and the QP value of the static low-frequency region corresponding to the target exposure gain value. The first preset formulas may be described below.

$$QP1 = \begin{cases} QP_{good} & \text{motion, feature, and } ROI \text{ region} \\ QP_{normal} & \text{static bright region} \\ QP_{poor} & \text{static dark region} \\ QP > QP_{poor} & \text{static excessive dark region} \end{cases}$$

$$QP2 = \begin{cases} 0 & \text{static low-frequency region} \\ a & \text{static medium-frequency region} \\ b & \text{static high-frequency region} \\ b > a > 0 \end{cases}$$

$$QP3 = \begin{cases} 0 & \text{motion, feature, and } ROI \text{ low-frequency region} \\ 0 & \text{motion, feature, and } ROI \text{ medium-frequency region} \\ a & \text{motion, feature, and } ROI \text{ high-frequency region} \\ a > 0 \end{cases}$$

$$QP4 = \begin{cases} 0 & \begin{array}{l} P \text{ frame non-motion region} \\ P\_SKIP \text{ macroblock encoding} \end{array} \\ c & \begin{array}{l} P \text{ frame non-motion region} \\ \text{non-}P\_SKIP \text{ macroblock encoding} \end{array} \\ c > 0 \end{cases}$$

$$QP = QP1 + QP2 + QP3 + QP4$$

In the case where the target exposure gain value corresponds to the medium-noise interval, the QP adjustment value of each status region in the image to be encoded is determined according to second preset formulas based on the QP value of the motion high-frequency region, the QP value of the motion low-frequency region, the QP value of the static high-frequency region, and the QP value of the static low-frequency region corresponding to the target exposure gain value. The second preset formulas may be described below.

$$QP1 = \begin{cases} QP_{good} & \text{motion, feature, and } ROI \text{ region} \\ \dfrac{QP_{normal} + QP_{poor}}{2} & \text{static bright region} \\ 2^*QP_{poor} - QP_{normal} & \text{static dark region} \\ QP > 2^*QP_{poor} - QP_{normal} & \text{static excessive dark region} \end{cases}$$

$$QP2 = \begin{cases} 0 & \text{static low-frequency region} \\ a & \text{static medium-frequency region} \\ b & \text{static high-frequency region} \\ b > a > 0 \end{cases}$$

$$QP3 = \begin{cases} 0 & \text{motion, feature, and } ROI \text{ low-frequency region} \\ 0 & \text{motion, feature, and } ROI \text{ medium-frequency region} \\ a & \text{motion, feature, and } ROI \text{ high-frequency region} \\ a > 0 \end{cases}$$

$$QP4 = \begin{cases} 0 & \begin{array}{l} P \text{ frame non-motion region} \\ P\_SKIP \text{ macroblock encoding} \end{array} \\ c & \begin{array}{l} P \text{ frame non-motion region} \\ \text{non-}P\_SKIP \text{ macroblock encoding} \end{array} \\ c > 0 \end{cases}$$

$$QP = QP1 + QP2 + QP3 + QP4$$

In the case where the target exposure gain value corresponds to the high-noise interval, the QP adjustment value of each status region in the image to be encoded is determined according to third preset formulas based on the QP value of the motion high-frequency region, the QP value of the motion low-frequency region, the QP value of the static high-frequency region, and the QP value of the static low-frequency region corresponding to the target exposure gain value. The third preset formulas may be described below.

$$QP1 = \begin{cases} QP_{good} & \text{motion, feature, and } ROI \text{ region} \\ QP_{normal} & \text{static bright region} \\ 2^*QP_{poor} - QP_{normal} & \text{static dark region} \\ 51 & \text{static excessive dark region} \end{cases}$$

$$QP2 = \begin{cases} 0 & \text{static low-frequency region} \\ 0 & \text{static medium-frequency region} \\ b & \text{static high-frequency region} \\ b > 0 \end{cases}$$

$$QP3 = \begin{cases} 0 & \text{motion, feature, and } ROI \text{ low-frequency region} \\ 0 & \text{motion, feature, and } ROI \text{ medium-frequency region} \\ 0 & \text{motion, feature, and } ROI \text{ high-frequency region} \end{cases}$$

$$QP4 = \begin{cases} 0 & \begin{array}{l} P \text{ frame non-motion region} \\ P\_SKIP \text{ macroblock encoding} \end{array} \\ c & \begin{array}{l} P \text{ frame non-motion region} \\ \text{non-}P\_SKIP \text{ macroblock encoding} \end{array} \\ c > 0 \end{cases}$$

$$QP = QP1 + QP2 + QP3 + QP4$$

In the first preset formulas, the second preset formulas, and the third preset formulas, $QP_{good}$, $QP_{normal}$, and $QP_{poor}$ in QP1 may be the good QP value, normal QP value, and poor QP value among the QP value of the motion high-frequency region, the QP value of the motion low-frequency region, the QP value of the static high-frequency region, and the QP value of the static low-frequency region corresponding to the target exposure gain value in the preset QP value table, respectively; the static medium-frequency region in QP2 is a transition region between the static high-frequency region and the static low-frequency region, a and b both may be the difference between the QP value of the static high-frequency region and the QP value of the static low-frequency region corresponding to the target exposure gain value, and the user may also perform flexible adjustment according to actual needs, which will not be repeated herein; the motion, feature, and ROI medium-frequency region in QP3 are a transition region between the motion, feature, and ROI high-frequency region and the motion, feature, and ROI low-frequency region, and a is the difference between the QP value of the motion high-frequency region and the QP value of the motion low-frequency region corresponding to the target exposure gain value; in QP4, $$c = \left(\frac{\text{actual encoding rate}}{\text{theoretical encoding rate}} - 1\right) * 6,$$

and the QP adjustment value of each status region is determined according to QP=QP1+QP2+QP3±QP4.

It should be noted that a and b may not be the difference between the QP value of the static high-frequency region and the QP value of the static low-frequency region and are preset to other values. A feature region may be set according to actual needs. For example, a region in which features such as a human face can be recognized may serve as the feature region. The theoretical encoding rate is a theoretical value of the encoding rate of the image to be encoded, and the theoretical encoding rate may be calculated according to a preset calculation method after step S102 (that is, after the image to be encoded is divided into multiple status regions). The actual encoding rate may be an encoding rate obtained by the video encoder 105 performing the actual pre-encoding on the image to be encoded. In the first preset formulas, the value of QP1 of the static excessive dark region may be set according to actual needs, and the value of QP1 of the static excessive dark region needs to make the inequality QP>$QP_{poor}$ true; in the second preset formulas, the value of QP1 of the static excessive dark region may be set according to actual needs, and the value of QP1 of the static excessive dark region needs to make the inequality QP>2*$QP_{poor}$−$QP_{normal}$ true.

In the first preset formulas, the second preset formulas, and the third preset formulas, SKIP macroblock encoding means that the pixel residual and motion vector residual of the macroblock are not written into the encoding streaming during encoding, only SKIP macroblock identification is performed on the macroblock, and during decoding, the pixel of the macroblock in the current frame is restored through a reference frame by using an approximate substitution restoration method. For a P frame, the SKIP macroblock is a P-SKIP macroblock; and for a B frame, the SKIP macroblock is a B-SKIP macroblock. In the video encoding process, the encoding rate may be reduced by adjusting the interframe SKIP strategy.

Specifically, a P frame macroblock in a static region generally uses P_SKIP macroblock encoding. However, under different exposure gain values, P-block or I-block encoding may be used due to the influence of noise, which makes the encoding rate increase. To solve this problem, the static excessive dark region may be forced to use a large proportion of the P_SKIP macroblock encoding so that the encoding rate is reduced in an active manner.

That is to say, in the process of determining the QP adjustment value of each status region in the image to be encoded, the QP adjustment value of the dark region is upgraded to the relatively poor QP value between the QP value of the static high-frequency region and the QP value of the staic low-frequency region corresponding to the target exposure gain value in the preset QP value table; the QP adjustment value of the dark region is continuously upgraded, or the P_SKIP macroblock encoding is directly used for the upgrade so that the encoding rate is reduced, and it is advisable that the obtained video encoding rate reaches the expected standard.

Moreover, if a reference frame image of the image to be encoded is a P frame, the average encoding rate of the unit macroblock in the static region in the reference frame image is greater than a preset threshold, and the corresponding region of the image to be encoded is also a static region, then the QP value of each macroblock in the static region in the image to be encoded is increased, and the ratio of the P_SKIP macroblock encoding is increased. Specifically, the QP encoding value of each macroblock in the static region in the image to be encoded may be obtained by adding c based on the QP encoding value of the corresponding macroblock in the reference frame image, and the calculation formula of c is $$c = \left(\frac{\text{actual encoding rate}}{\text{theoretical encoding rate}} - 1\right) * 6.$$

The interframe SKIP strategy of the B frame is similar to that of the P frame, and will not be repeated herein.

In step S104, a QP encoding value of each macroblock in the reference frame image of the image to be encoded is acquired.

In this embodiment, in order to determine the QP encoding value of macroblock information of each macroblock in the image to be encoded, macroblock information of each macroblock in the reference frame image of the image to be encoded also needs to be determined, the size of each macroblock may be 16×16, and the macroblock information may include, and is not limited to, an encoding rate, a macroblock type, a QP encoding value, and so on; and the exposure gain value corresponding to the reference frame image is recorded. It should be noted that the execution of step S104 is not limited to be after step S103 and may also be before step S101, which is not limited herein.

In step S105, a QP encoding value of each macroblock in the image to be encoded is determined according to the QP encoding value of each macroblock in the reference frame image and the QP adjustment value of each status region in the image to be encoded.

In this embodiment, in the case where the image to be encoded is a key frame, that is, an I frame, the user may determine the QP encoding value of each macroblock in the image to be encoded and only needs to ensure that the minimum QP encoding value in the image to be encoded is the $QP_{good}$ corresponding to the target exposure gain value in the preset QP value table.

In the case where the image to be encoded is a prediction frame, that is, a P frame or a B frame, the QP encoding value of each macroblock in the reference frame image is superposed with the QP adjustment value of each status region in the image to be encoded so that the QP encoding value of each macroblock in the image to be encoded is obtained.

In a specific implementation, the video encoding method provided in embodiments of the present disclosure may include the step of sequentially compressing a sequence of video frames with a group of pictures as an encoding structure unit, where the group of pictures includes a key frame at the start position and a prediction frame following the key frame. The compression of a single video frame may be implemented through steps S101 to S105.

In step S106, the image to be encoded is compressed and encoded by using the QP encoding value of each macroblock in the image to be encoded.

In this embodiment, after the QP encoding value of each macroblock in the image to be encoded is determined, the image to be encoded is compressed and encoded according to the QP encoding value of each macroblock. The process of compressing and encoding the image to be encoded may be: generating a residual coefficient based on the difference between the image to be encoded and the reference frame image, and controlling the size of the residual coefficient through the QP encoding value of each macroblock in the image to be encoded. In this manner, the encoding rate is reduced.

In this embodiment, the sequence of video frames are sequentially compressed with a GOP as the encoding structure unit. The GOP includes the key frame at the start position and the prediction frame following the key frame. The GOP encoding structure may be any GOP encoding structure in the technical field of video encoding. In this embodiment, an IPPP encoding structure is used as an example to describe the solution in detail. In the IPPP encoding structure, an I frame is a full-frame compressed frame. The smaller the interval of I frames of the sequence of video frames is, the less the GOP length is, and the greater the video encoding rate is. Therefore, in order to effectively reduce the video encoding rate from the encoding structure, embodiments of the present disclosure further include steps S107 to S108.

In step S107, a motion vector of the image to be encoded is acquired, and the GOP length of the image to be encoded is calculated according to the motion vector.

In this embodiment, under different exposure gain values, the GOP and the GOP length of the image to be encoded are adjusted according to the motion vector of the image to be encoded. Generally, clear I frames account for about 50% of the total encoding rate, which is a relatively large loss. At the same time, one I frame is set to about 2 seconds in the current surveillance field so that the ability to resist network packet loss is improved. However, this setting severely restricts the improvement of video encoding compression rate. Therefore, the GOP needs to be increased. Specifically, the GOP needs to be increased according to the motion vector of the image to be encoded and the corresponding exposure gain value so that the video encoding compression rate is effectively improved.

In this embodiment, according to the motion vector of the image to be encoded, the GOP length of the image to be encoded is calculated by using the formula of the GOP length of $$GOPSIZE = GOPSIZE_{max} + \frac{|MV_{cur} - MV_{min}|}{|MV_{max} - MV_{min}|} * (GOPSIZE_{min} - GOPSIZE_{max}),$$

where GOPSIZE denotes the GOP length of the image to be encoded, $GOPSIZE_{max}$ denotes the maximum GOP length, $GOPSIZE_{min}$ denotes the minimum GOP length, $MV_{cur}$ denotes the motion vector of the image to be encoded, $MV_{min}$ denotes the minimum value of the motion vector, and $MV_{max}$ denotes the maximum value of the motion vector. $GOPSIZE_{max}$ and $GOPSIZE_{min}$ are adjusted by the user according to the exposure gain value of the image to be encoded. After the GOP length of the image to be encoded is adjusted, the interval of I frames in the GOP encoding structure may be a multiple of the original interval of I frames in the GOP encoding structure, so the ability to resist network packet loss can be further optimized. Please refer to step S108 for details.

In step S108, the GOP is adjusted according to the GOP length of the image to be encoded. The adjusted GOP includes one key frame and at least one prediction frame encoding segment. The prediction frame encoding segment includes one reference prediction frame and multiple normal prediction frames, the reference prediction frame is encoded with reference to the key frame, and the normal prediction frames are subjected to frame-by-frame reference encoding in the prediction frame encoding segment.

In a specific implementation, in the same prediction frame encoding segment, each normal prediction frame is encoded with reference to the previous frame of the normal prediction frame, where the previous frame of the normal prediction frame may be a reference prediction frame or may be another normal prediction frame.

Figure 3:
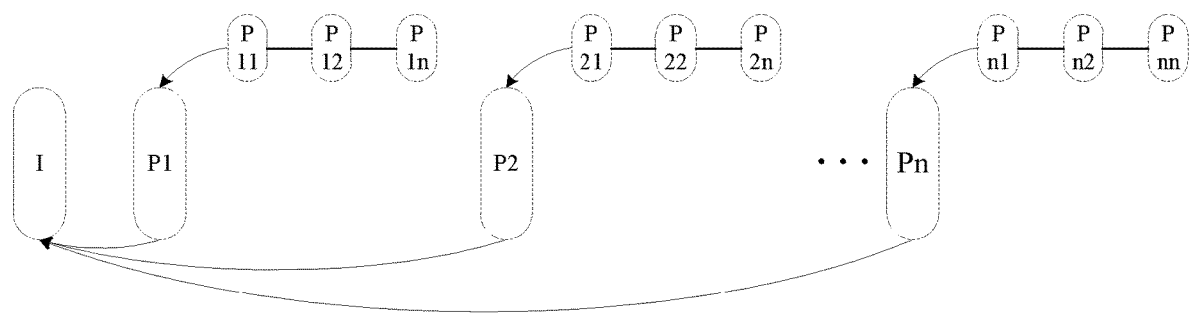
FIG. 3 is an example diagram of a first encoding manner of GOP according to an embodiment of the present disclosure.

Referring to FIG. 3, the adjusted GOP includes one key frame (that is, an I frame) and at least one prediction frame encoding segment. The prediction frame encoding segment includes one reference prediction frame (for example, a P1 frame) and multiple normal prediction frames (for example, a P11 frame, a P12 frame, and a P1n frame). The reference prediction frame is encoded with reference to the key frame (that is, the I frame), and the normal prediction frames are subjected to frame-by-frame reference encoding in the prediction frame encoding segment. The reference prediction frame appears every two seconds so that it is ensured that the image may be restored within two seconds if a certain P frame is lost.

During the GOP encoding, the reference prediction frame is encoded with reference to the key frame (that is, the I frame), and the normal prediction frames following the reference prediction frame are subjected to frame-by-frame reference encoding. The key frame (that is, the I frame) is used to ensure the restoration of the video image after the reference prediction frame is lost. The reference prediction frame is used to ensure the restoration of the video image after the normal prediction frame is lost. In this manner, while the quality of the decoded video image is ensured, the GOP is increased by multiple times and the encoding rate of the video encoding is effectively reduced.

Moreover, if the I frame data packet loss occurs, it can be solved by forcing the I frame. In this manner, the impact of the increase of the GOP can be reduced to a certain extent.

In step S109, control information of the adjusted GOP is acquired, and the control information is filled to supplemental enhancement information (SEI) of the key frame so that the adjusted GOP is decoded according to the control information during decoding and playback.

In this embodiment, since the GOP encoding structure shown in FIG. 3 is adjusted, a decoding end also needs to be controlled and optimized. In the case where the playback click time corresponds to one normal prediction frame, other video frames before the normal prediction frame need to be controlled for decoding and need not to be displayed. For example, if the playback click time is a P22 frame, the I frame, a P2 frame, and a P21 frame before the P22 frame need to be controlled for decoding and need not to be displayed, where P2 is one frame before P21 and adjacent to P21, and P21 is one frame before P22 and adjacent to P22. Therefore, during the video encoding process, the set control information may be carried through the supplemental enhancement information (SEI) so that it is ensured that the playback screen does not jump during playback.

In step S110, motion information of the key frame of the adjusted GOP is acquired, and in the case where the motion information is greater than a preset motion threshold, the key frame is reapplied. In embodiments of the present disclosure, since all the subsequent P frames that refer to the I frame become greater in the case where the frame with high motion amount serves as the reference frame, the I frame needs to be reapplied in the case where the motion detection information of the I frame is greater than the preset motion threshold (for example, 50%), that is, in the case where more than 50% of the image in the I frame is the motion region.

In step S111, in the case where no motion information exists in the image to be encoded, the GOP of the image to be encoded includes one key frame and at least one prediction frame, and each prediction frame is encoded with reference to the key frame.

Figure 4:
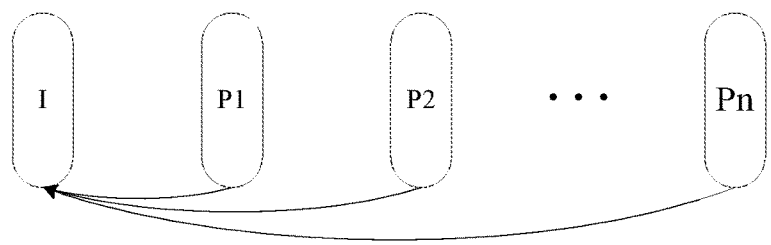
FIG. 4 is an example diagram of a second encoding manner of GOP according to an embodiment of the present disclosure.

In this embodiment, the GOP encoding structure shown in FIG. 3 is optimized in the case of full frames. In the case of full frames, the video encoding device 100 may reach the maximum frame rate, and the maximum frame rate is generally 25 to 30 frames per second. However, in many cases in actual surveillance applications, no moving objects exist. At this time, the encoding frame rate may be adjusted according to the motion detection information. The adjustment method may be as follows: in the case where the motion information exists, the GOP encoding structure shown in FIG. 3 is used for full-frame-rate encoding; in the case where no motion information exists, the encoding structure shown in FIG. 4 is used for encoding, and in this case, the frame rate may be as low as 16 seconds per frame and the frame rate information needs to be carried at the same time for the decoding and playback time window.

Embodiment Two

Referring to FIG. 5, FIG. 5 is a block diagram of a video encoding apparatus 200 according to an embodiment of the present disclosure. The video encoding apparatus 200 includes a status information statistics module 201, a status region division module 202, a QP adjustment value determination module 203, a QP encoding value acquisition module 204, a QP encoding value determination module 205, a compression encoding module 206, a GOP length calculation module 207, and a GOP adjustment module 208, a first execution module 209, a second execution module 210, and a third execution module 211.

The status information statistics module 201 is configured to acquire an image to be encoded, and acquire status information of each macroblock in the image to be encoded.

The status region division module 202 is configured to divide the image to be encoded into multiple status regions according to the status information of each macroblock.

In this embodiment, the status region division module 202 is configured to, according to motion detection information, divide the image to be encoded into a motion region and a static region; to, according to brightness information, divide the motion region into a motion bright region, a motion dark region, and a motion excessive dark region and divide the static region into a static bright region, a static dark region, and a static excessive dark region; and to, according to noise variance information, divide the motion bright region, the motion dark region, the motion excessive dark region, the static bright region, the static dark region, and the static excessive dark region into a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region, respectively.

Specifically, the status region division module 202 may be configured to, according to the noise variance information, divide the motion bright region into the motion high-frequency bright region and the motion low-frequency bright region, divide the motion dark region into the motion high-frequency dark region and the motion low-frequency dark region, divide the motion excessive dark region into the motion high-frequency excessive dark region and the motion low-frequency excessive dark region, divide the static bright region into the static high-frequency bright region and the static low-frequency bright region, divide the static dark region into the static high-frequency dark region and the static low-frequency dark region, and divide the static excessive dark region into the static high-frequency excessive dark region and the static low-frequency excessive dark region.

The QP adjustment value determination module 203 is configured to determine a QP adjustment value of each status region in the image to be encoded according to a preset QP value table.

In embodiments of the present disclosure, the QP adjustment value determination module 203 is configured to acquire a current exposure gain value of the image to be encoded; to compare the current exposure gain value with multiple test exposure gain values one by one, and determine a target exposure gain value consistent with the current exposure gain value from the multiple test exposure gain values; and to determine the QP adjustment value of each status region in the image to be encoded according to a QP value of the motion high-frequency region, a QP value of the motion low-frequency region, a QP value of the static high-frequency region, and a QP value of the static low-frequency region corresponding to the target exposure gain value.

The QP encoding value acquisition module 204 is configured to acquire a QP encoding value of each macroblock in a reference frame image of the image to be encoded.

The QP encoding value determination module 205 is configured to determine a QP encoding value of each macroblock in the image to be encoded according to the QP encoding value of each macroblock in the reference frame image and the QP adjustment value of each status region in the image to be encoded.

The compression encoding module 206 is configured to compress and encode the image to be encoded by using the QP encoding value of each macroblock in the image to be encoded.

The GOP length calculation module 207 is configured to acquire a motion vector of the image to be encoded and calculate a GOP length of the image to be encoded according to the motion vector.

In embodiments of the present disclosure, the GOP length calculation module 207 is configured to, according to the motion vector of the image to be encoded, calculate the GOP length of the image to be encoded by using a formula of the GOP length of $$GOPSIZE = GOPSIZE_{max} + \frac{|MV_{cur} - MV_{min}|}{|MV_{max} - MV_{min}|} * (GOPSIZE_{min} - GOPSIZE_{max}),$$

where GOPSIZE denotes the GOP length of the image to be encoded, $GOPSIZE_{max}$ denotes a maximum GOP length, $GOPSIZE_{min}$ denotes a minimum GOP length, $MV_{cur}$ denotes the motion vector of the image to be encoded, $MV_{min}$ denotes a minimum value of the motion vector, and $MV_{max}$ denotes a maximum value of the motion vector.

The GOP adjustment module 208 is configured to adjust the GOP according to the GOP length of the image to be encoded. The adjusted GOP includes one key frame and at least one prediction frame encoding segment, where the prediction frame encoding segment includes one reference prediction frame and multiple normal prediction frames, the reference prediction frame is encoded with reference to the key frame, and the normal prediction frames are subjected to frame-by-frame reference encoding in the prediction frame encoding segment.

In a specific implementation, in the same prediction frame encoding segment, each normal prediction frame is encoded with reference to the previous frame of the normal prediction frame, where the previous frame of the normal prediction frame may be a reference prediction frame or may be another normal prediction frame.

The first execution module 209 is configured to acquire control information of the adjusted GOP and fill the control information to SEI of the key frame so that the adjusted GOP is decoded according to the control information during decoding and playback.

The second execution module 210 is configured to acquire motion information of the key frame of the adjusted GOP and reapply for the key frame in the case where the motion information is greater than a preset motion threshold.

The third execution module 211 is configured to, in the case where no motion information exists in the image to be encoded, cause the GOP of the image to be encoded to include one key frame and at least one prediction frame, and encode each prediction frame with reference to the key frame.

It will be apparent to those skilled in the art that to describe conveniently and briefly, for specific processes of operation of the video encoding apparatus 200, reference may be made to corresponding processes in the method embodiments, and repetition will not be made here.

To sum up, the present disclosure provides a video encoding method and apparatus. The method includes: acquiring an image to be encoded and acquiring status information of each macroblock in the image to be encoded; dividing the image to be encoded into multiple status regions according to the status information of each macroblock; determining a QP adjustment value of each of the multiple status regions in the image to be encoded according to a preset QP value table; acquiring a QP encoding value of each macroblock in a reference frame image of the image to be encoded; determining a QP encoding value of each marcoblock in the image to be encoded according to the QP encoding value of each macroblock in the reference frame image and the QP adjustment value of each of the multiple status regions in the image to be encoded; and compressing and encoding the image to be encoded by using the QP encoding value of each macroblock in the image to be encoded. In embodiments of the present disclosure, before compression and encoding are performed, the QP encoding value of each macroblock is set according to the status of each macroblock. In this manner, during the subsequent compression and encoding, each macroblock can be compressed and encoded according to the status of each macroblock. For example, the quality of the macroblock with little change may be reduced so that the amount of data can be reduced to the greatest extent, and the video streaming encoding rate is effectively reduced while the image quality is ensured.

The functional modules may be stored in a computer-readable storage medium if implemented in the form of software function modules and sold or used as independent products. Based on this understanding, the technical solutions provided in the present disclosure substantially, the part contributing to the related art, or part of the technical solutions, may be embodied in the form of a software product. This computer software product is stored on a storage medium, and includes several instructions for enabling a computer device (which may be a personal computer, a server, a network device or the like) to perform all or part of the steps in the methods provided in embodiments of the present disclosure. The storage medium includes a USB flash disk, a mobile hard disk, a read-only memory (ROM), a random-access memory (RAM), a magnetic disk, an optical disk or another medium capable of storing program codes.

What is claimed is:

1. A video encoding method, wherein the method sequentially compresses a sequence of video frames with a group of pictures as an encoding structure unit, and the group of pictures comprises a key frame at a start position and a prediction frame following the key frame, wherein the method comprises:
 acquiring an image to be encoded, and acquiring status information of each macroblock in the image to be encoded;
 dividing the image to be encoded into a plurality of status regions according to the status information of the each macroblock;
 determining a quantizer parameter adjustment value of each of the plurality of status regions in the image to be encoded according to a preset quantizer parameter value table;
 acquiring a quantizer parameter encoding value of each macroblock in a reference frame image of the image to be encoded;
 determining a quantizer parameter encoding value of the each macroblock in the image to be encoded according to the quantizer parameter encoding value of the each macroblock in the reference frame image and the quantizer parameter adjustment value of each of the plurality of status regions in the image to be encoded;

compressing and encoding the image to be encoded by using the quantizer parameter encoding value of the each macroblock in the image to be encoded;

acquiring a motion vector of the image to be encoded, and calculating a length of a group of pictures of the image to be encoded according to the motion vector; and adjusting the group of pictures according to the length of the group of pictures of the image to be encoded, wherein the adjusted group of pictures comprises one key frame and at least one prediction frame encoding segment, wherein the at least one prediction frame encoding segment comprises one reference prediction frame and a plurality of normal prediction frames, the reference prediction frame is encoded with reference to the key frame, and the plurality of normal prediction frames are subjected to frame-by-frame reference encoding in the at least one prediction frame encoding segment.

2. The method of claim 1, wherein the status information comprises motion detection information, brightness information, and noise variance information, and the plurality of status regions comprise a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region;

wherein dividing the image to be encoded into the plurality of status regions according to the status information of the each macroblock comprises:

according to the motion detection information, dividing the image to be encoded into a motion region and a static region;

according to the brightness information, dividing the motion region into a motion bright region, a motion dark region, and a motion excessive dark region, and dividing the static region into a static bright region, a static dark region, and a static excessive dark region; and according to the noise variance information, dividing the motion bright region, the motion dark region, the motion excessive dark region, the static bright region, the static dark region, and the static excessive dark region into the motion high-frequency bright region, the motion low-frequency bright region, the motion high-frequency dark region, the motion low-frequency dark region, the motion high-frequency excessive dark region, the motion low-frequency excessive dark region, the static high-frequency bright region, the static low-frequency bright region, the static high-frequency dark region, the static low-frequency dark region, the static high-frequency excessive dark region, and the static low-frequency excessive dark region.

3. The method of claim 2, wherein the preset quantizer parameter value table comprises a plurality of test exposure gain values, and a quantizer parameter value of a motion high-frequency region, a quantizer parameter value of a motion low-frequency region, a quantizer parameter value of a static high-frequency region, and a quantizer parameter value of a static low-frequency region corresponding to a respective one of the plurality of test exposure gain values;

wherein determining the quantizer parameter adjustment value of each of the plurality of status regions in the image to be encoded according to the preset quantizer parameter value table comprises:

acquiring a current exposure gain value of the image to be encoded;

comparing the current exposure gain value with the plurality of test exposure gain values one by one, and determining a target exposure gain value consistent with the current exposure gain value from the plurality of test exposure gain values; and determining the quantizer parameter adjustment value of the each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value.

4. The method of claim 3, wherein each of the plurality of test exposure gain values corresponds to one noise interval, and the noise interval is a low-noise interval, a medium-noise interval, or a high-noise interval;

in a case where the image to be encoded is a prediction frame, determining the quantizer parameter adjustment value of each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value comprises:

determining a noise interval corresponding to the target exposure gain value;

in a case where the target exposure gain value corresponds to the low-noise interval, determining the quantizer parameter adjustment value of each of the plurality of status regions in the image to be encoded based on first preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value;

in a case where the target exposure gain value corresponds to the medium-noise interval, determining the quantizer parameter adjustment value of each of the plurality of status regions in the image to be encoded based on second preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value; and in a case where the target exposure gain value corresponds to the high-noise interval, determining the quantizer parameter adjustment value of each of the plurality of status regions in the image to be encoded based on third preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value.

5. The method of claim 1, further comprising:
acquiring control information of the adjusted group of pictures, and filling the control information to supplemental enhancement information of the key frame so that the adjusted group of pictures is decoded according to the control information during decoding and playback.

6. The method of claim 1, wherein calculating the length of the group of pictures of the image to be encoded according to the motion vector comprises:
according to the motion vector of the image to be encoded, calculating the length of the group of pictures of the image to be encoded by using a formula of the length of the group of pictures of $$GOPSIZE = GOPSIZE_{max} + \frac{|MV_{cur} - MV_{min}|}{|MV_{max} - MV_{min}|} * (GOPSIZE_{min} - GOPSIZE_{max}),$$

wherein GOPSIZE denotes the length of the group of pictures of the image to be encoded, $GOPSIZE_{max}$ denotes a maximum length of the group of pictures, $GOPSIZE_{min}$ denotes a minimum length of the group of pictures, $MV_{car}$ denotes the motion vector of the image to be encoded, $MV_{min}$ denotes a minimum value of the motion vector, and $MV_{max}$ denotes a maximum value of the motion vector.

7. The method of claim 1, further comprising:
acquiring motion information of the key frame of the adjusted group of pictures, and reapplying for the key frame in a case where the motion information is greater than a preset motion threshold.

8. The method of claim 1, further comprising:
in a case where no motion information exists in the image to be encoded, the group of pictures of the image to be encoded comprising one key frame and at least one prediction frame, and encoding the at least one prediction frame with reference to the key frame.

9. The method of claim 4, wherein determining the quantizer parameter adjustment value of each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value comprises:
determining the quantizer parameter adjustment value of each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value and by performing SKIP macroblock encoding on the static excessive dark region;
the first preset formulas are:

$$QP1 = \begin{cases} QP_{good} & \text{motion, feature, and region of interest} \\ QP_{normal} & \text{static bright region} \\ QP_{poor} & \text{static dark region} \\ QP > QP_{poor} & \text{static excessive dark region} \end{cases}$$

$$QP2 = \begin{cases} 0 & \text{static low-frequency region} \\ a & \text{static medium-frequency region} \\ b & \text{static high-frequency region} \\ b > a > 0 \end{cases}$$

$$QP3 = \begin{cases} 0 & \text{motion, feature, and low-frequency region of interest} \\ 0 & \text{motion, feature, and medium-frequency region of interest} \\ a & \text{motion, feature, and high-frequency region of interest} \\ a > 0 \end{cases}$$

$$QP4 = \begin{cases} 0 & \begin{array}{l} P \text{ frame non-motion region} \\ \text{P\_SKIP macroblock encoding} \end{array} \\ c & \begin{array}{l} P \text{ frame non-motion region} \\ \text{non-P\_SKIP macroblock encoding} \end{array} \\ c > 0 \end{cases}$$

$$QP = QP1 + QP2 + QP3 + QP4;$$

the second preset formulas are:

$$QP1 = \begin{cases} QP_{good} & \text{motion, feature, and region of interest} \\ \dfrac{QP_{normal} + QP_{poor}}{2} & \text{static bright region} \\ 2^*QP_{poor} - QP_{normal} & \text{static dark region} \\ QP > 2^*QP_{poor} - QP_{normal} & \text{static excessive dark region} \end{cases}$$

$$QP2 = \begin{cases} 0 & \text{static low-frequency region} \\ a & \text{static medium-frequency region} \\ b & \text{static high-frequency region} \\ b > a > 0 \end{cases}$$

$$QP3 = \begin{cases} 0 & \text{motion, feature, and low-frequency region of interest} \\ 0 & \text{motion, feature, and medium-frequency region of interest} \\ a & \text{motion, feature, and high-frequency region of interest} \\ a > 0 \end{cases}$$

$$QP4 = \begin{cases} 0 & \begin{array}{l} P \text{ frame non-motion region} \\ \text{P\_SKIP macroblock encoding} \end{array} \\ c & \begin{array}{l} P \text{ frame non-motion region} \\ \text{non-P\_SKIP macroblock encoding} \end{array} \\ c > 0 \end{cases}$$

$$QP = QP1 + QP2 + QP3 + QP4;$$

and
the third preset formulas are:

$$QP1 = \begin{cases} QP_{good} & \text{motion, feature, and region of interest} \\ QP_{normal} & \text{static bright region} \\ 2^*QP_{poor} - QP_{normal} & \text{static dark region} \\ 51 & \text{static excessive dark region} \end{cases}$$

$$QP2 = \begin{cases} 0 & \text{static low-frequency region} \\ 0 & \text{static medium-frequency region} \\ b & \text{static high-frequency region} \\ b > 0 \end{cases}$$

$$QP3 = \begin{cases} 0 & \text{motion, feature, and low-frequency region of interest} \\ 0 & \text{motion, feature, and medium-frequency region of interest} \\ 0 & \text{motion, feature, and high-frequency region of interest} \end{cases}$$

-continued $$QP4 = \begin{cases} 0 & \begin{array}{l}P \text{ frame non-motion region} \\ P\_SKIP \text{ macroblock encoding}\end{array} \\ c & \begin{array}{l}P \text{ frame non-motion region} \\ \text{non-}P\_SKIP \text{ macroblock encoding}\end{array} \\ c > 0 \end{cases}$$

$$QP = QP1 + QP2 + QP3 + QP4; \text{ and}$$

in the first preset formulas, the second preset formulas, and the third preset formulas, QP is a quantizer parameter value, $QP_{good}$, $QP_{normal}$, and $QP_{poor}$ or of QP1 are a good quantizer parameter value, a normal quantizer parameter value, and a poor quantizer parameter value among the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value in the preset quantizer parameter value table, respectively; the static medium-frequency region of QP2 is a transition region between the static high-frequency region and the static low-frequency region, a and b both are a preset value; the motion, feature, and medium-frequency region of interest of QP3 is a transition region between the motion, feature, and high-frequency region of interest and the motion, feature, and low-frequency region of interest; and in QP4

$$c = \left(\frac{\text{actual encoding rate}}{\text{theoretical encoding rate}} - 1\right) * 6.$$

10. An electronic device, wherein the device is configured to sequentially compress a sequence of video frames with a group of pictures as an encoding structure unit, and the group of pictures comprises a key frame at a start position and a prediction frame following the key frame, and the method comprises, wherein the device comprises:
at least one processor; and
a memory, which is configured to store at least one program executable by the processor;
wherein the at least one processor is collectively configured to at least:
acquire an image to be encoded, and acquire status information of each macroblock in the image to be encoded;
divide the image to be encoded into a plurality of status regions according to the status information of the each macroblock;
determine a quantizer parameter adjustment value of each of the plurality of status regions in the image to be encoded according to a preset quantizer parameter value table;
acquire a quantizer parameter encoding value of each macroblock in a reference frame image of the image to be encoded;
determine a quantizer parameter encoding value of the each macroblock in the image to be encoded according to the quantizer parameter encoding value of the each macroblock in the reference frame image and the quantizer parameter adjustment value of each of the plurality of status regions in the image to be encoded;
compress and encode the image to be encoded by using the quantizer parameter encoding value of the each macroblock in the image to be encoded;
acquire a motion vector of the image to be encoded, and calculate a length of a group of pictures of the image to be encoded according to the motion vector; and
adjust the group of pictures according to the length of the group of pictures of the image to be encoded, wherein the adjusted group of pictures comprises one key frame and at least one prediction frame encoding segment, wherein the at least one prediction frame encoding segment comprises one reference prediction frame and a plurality of normal prediction frames, the reference prediction frame is encoded with reference to the key frame, and the plurality of normal prediction frames are subjected to frame-by-frame reference encoding in the at least one prediction frame encoding segment.

11. A non-transitory computer-readable storage medium, which stores computer programs for implementing the video encoding method of claim 1 when the computer programs are executed by a processor.

12. The electronic device of claim 10, wherein the at least one processor is further configured to:
acquire control information of the adjusted group of pictures, and fill the control information to supplemental enhancement information of the key frame so that the adjusted group of pictures is decoded according to the control information during decoding and playback.

13. The electronic device of claim 10, wherein the at least one processor is further configured to:
acquire motion information of the key frame of the adjusted group of pictures, and reapply for the key frame in a case where the motion information is greater than a preset motion threshold.

14. The electronic device of claim 10, wherein the at least one processor is further configured to:
in a case where no motion information exists in the image to be encoded, cause the group of pictures of the image to be encoded to comprise one key frame and at least one prediction frame, and encode the at least one prediction frame with reference to the key frame.

15. The electronic device of claim 10, wherein the at least one processor is configured to calculate the length of the group of pictures of the image to be encoded according to the motion vector in the following manner:
according to the motion vector of the image to be encoded, calculating the length of the group of pictures of the image to be encoded by using a formula of the length of the group of pictures of $$GOPSIZE = \\ GOPSIZE_{max} + \frac{|MV_{cur} - MV_{min}|}{|MV_{max} - MV_{min}|} * (GOPSIZE_{min} - GOPSIZE_{max}),$$

wherein $GOPSIZE_{max}$ denotes the length of the group of pictures of the image to be encoded, $GOPSIZE_{max}$ denotes a maximum length of the group of pictures, $GOPSIZE_{min}$ denotes a minimum length of the group of pictures, $MV_{cur}$ denotes the motion vector of the image to be encoded, $MV_{min}$ denotes a minimum value of the motion vector, and $MV_{max}$ denotes a maximum value of the motion vector.

16. The electronic device of claim 10, wherein the status information comprises motion detection information, brightness information, and noise variance information, and the plurality of status regions comprise a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region;

wherein the at least one processor is configured to divide the image to be encoded into the plurality of status regions according to the status information of the each macroblock in the following manners:

according to the motion detection information, divide the image to be encoded into a motion region and a static region;

according to the brightness information, divide the motion region into a motion bright region, a motion dark region, and a motion excessive dark region, and dividing the static region into a static bright region, a static dark region, and a static excessive dark region; and according to the noise variance information, divide the motion bright region, the motion dark region, the motion excessive dark region, the static bright region, the static dark region, and the static excessive dark region into the motion high-frequency bright region, the motion low-frequency bright region, the motion high-frequency dark region, the motion low-frequency dark region, the motion high-frequency excessive dark region, the motion low-frequency excessive dark region, the static high-frequency bright region, the static low-frequency bright region, the static high-frequency dark region, the static low-frequency dark region, the static high-frequency excessive dark region, and the static low-frequency excessive dark region.

17. The electronic device of claim 16, wherein the preset quantizer parameter value table comprises a plurality of test exposure gain values, and a quantizer parameter value of a motion high-frequency region, a quantizer parameter value of a motion low-frequency region, a quantizer parameter value of a static high-frequency region, and a quantizer parameter value of a static low-frequency region corresponding to a respective one of the plurality of test exposure gain values;

wherein the at least one processor is configured to determine the quantizer parameter adjustment value of each of the plurality of status regions in the image to be encoded according to the preset quantizer parameter value table in the following manners:

acquire a current exposure gain value of the image to be encoded;

compare the current exposure gain value with the plurality of test exposure gain values one by one, and determine a target exposure gain value consistent with the current exposure gain value from the plurality of test exposure gain values; and determine the quantizer parameter adjustment value of the each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value.

18. The electronic device of claim 17, wherein each of the plurality of test exposure gain values corresponds to one noise interval, and the noise interval is a low-noise interval, a medium-noise interval, or a high-noise interval;

in a case where the image to be encoded is a prediction frame, the at least one processor is configured to determine the quantizer parameter adjustment value of each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value in the following manners:

determine a noise interval corresponding to the target exposure gain value;

in a case where the target exposure gain value corresponds to the low-noise interval, determine the quantizer parameter adjustment value of each of the plurality of status regions in the image to be encoded based on first preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value;

in a case where the target exposure gain value corresponds to the medium-noise interval, determine the quantizer parameter adjustment value of each of the plurality of status regions in the image to be encoded based on second preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value; and in a case where the target exposure gain value corresponds to the high-noise interval, determine the quantizer parameter adjustment value of each of the plurality of status regions in the image to be encoded based on third preset formulas according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value.

19. A video encoding method, comprising:

acquiring an image to be encoded, and acquiring status information of each macroblock in the image to be encoded;

dividing the image to be encoded into a plurality of status regions according to the status information of the each macroblock;

determining a quantizer parameter adjustment value of each of the plurality of status regions in the image to be encoded according to a preset quantizer parameter value table;

acquiring a quantizer parameter encoding value of each macroblock in a reference frame image of the image to be encoded;

determining a quantizer parameter encoding value of the each macroblock in the image to be encoded according to the quantizer parameter encoding value of the each macroblock in the reference frame image and the quantizer parameter adjustment value of each of the plurality of status regions in the image to be encoded; and compressing and encoding the image to be encoded by using the quantizer parameter encoding value of the each macroblock in the image to be encoded;

wherein the status information comprises motion detection information, brightness information, and noise variance information, and the plurality of status regions comprise a motion high-frequency bright region, a motion low-frequency bright region, a motion high-frequency dark region, a motion low-frequency dark region, a motion high-frequency excessive dark region, a motion low-frequency excessive dark region, a static high-frequency bright region, a static low-frequency bright region, a static high-frequency dark region, a static low-frequency dark region, a static high-frequency excessive dark region, and a static low-frequency excessive dark region;

wherein dividing the image to be encoded into the plurality of status regions according to the status information of the each macroblock comprises:

according to the motion detection information, dividing the image to be encoded into a motion region and a static region;

according to the brightness information, dividing the motion region into a motion bright region, a motion dark region, and a motion excessive dark region, and dividing the static region into a static bright region, a static dark region, and a static excessive dark region; and according to the noise variance information, dividing the motion bright region, the motion dark region, the motion excessive dark region, the static bright region, the static dark region, and the static excessive dark region into the motion high-frequency bright region, the motion low-frequency bright region, the motion high-frequency dark region, the motion low-frequency dark region, the motion high-frequency excessive dark region, the motion low-frequency excessive dark region, the static high-frequency bright region, the static low-frequency bright region, the static high-frequency dark region, the static low-frequency dark region, the static high-frequency excessive dark region, and the static low-frequency excessive dark region.

20. The method of claim 19, wherein the preset quantizer parameter value table comprises a plurality of test exposure gain values, and a quantizer parameter value of a motion high-frequency region, a quantizer parameter value of a motion low-frequency region, a quantizer parameter value of a static high-frequency region, and a quantizer parameter value of a static low-frequency region corresponding to a respective one of the plurality of test exposure gain values;

wherein determining the quantizer parameter adjustment value of each of the plurality of status regions in the image to be encoded according to the preset quantizer parameter value table comprises:

acquiring a current exposure gain value of the image to be encoded;

comparing the current exposure gain value with the plurality of test exposure gain values one by one, and determining a target exposure gain value consistent with the current exposure gain value from the plurality of test exposure gain values; and determining the quantizer parameter adjustment value of the each of the plurality of status regions in the image to be encoded according to the quantizer parameter value of the motion high-frequency region, the quantizer parameter value of the motion low-frequency region, the quantizer parameter value of the static high-frequency region, and the quantizer parameter value of the static low-frequency region corresponding to the target exposure gain value.

* * * * *